United States Patent [19]
Rossigno et al.

[11] Patent Number: 5,338,107
[45] Date of Patent: Aug. 16, 1994

[54] CONTROL VALVE ACTUATOR

[75] Inventors: Louis P. Rossigno, Granger; Wayne A. Hewitt, LaPorte, both of Ind.

[73] Assignee: AlliedSignal Inc., Morristown, N.J.

[21] Appl. No.: 146,892

[22] Filed: Nov. 3, 1993

[51] Int. Cl.$^5$ .................... B60T 8/32; B60T 13/57
[52] U.S. Cl. ................... 303/113.3; 188/356; 303/114.3
[58] Field of Search ............ 303/113.3, 113.2, 114.3, 303/100, 13, 14, 114.1; 188/356, 357; 180/197; 91/376 R, 369.1, 369.3, 369.2

[56] References Cited

U.S. PATENT DOCUMENTS

| | | | |
|---|---|---|---|
| 4,474,005 | 10/1984 | Steer . | |
| 4,778,225 | 10/1988 | Rudolph et al. | 303/113.3 |
| 4,778,226 | 10/1988 | Brown . | |
| 4,953,446 | 9/1990 | Fecher et al. | 91/369.1 |
| 5,096,267 | 3/1992 | Volz | 303/113.3 |
| 5,172,964 | 12/1992 | Levrai et al. | 303/114.3 |
| 5,176,433 | 1/1993 | Byrnes et al. | 303/113.3 |

*Primary Examiner*—Douglas C. Butler
*Attorney, Agent, or Firm*—Leo H. McCormick, Jr.; Larry J. Palguta

[57] ABSTRACT

A servomotor having a control valve independently by a manual input applied to an operator pedal assembly to effect a brake application or a traction control force derived from a signal developed by a controller to selectively apply brake force to synchronize rotational spin of the wheels of a vehicle. An input rod connected to the control valve has a housing attached thereto with a traction control chamber therein. A sleeve which surrounds the input rod has a first flange that engages a shoulder on the input rod and a second flange that is connected to a diaphragm retained in the traction control chamber. A return spring acts on the first flange to urge the second flange and diaphragm against a stop in the housing. In response to an input signal the controller allows vacuum to be communicated to the traction control chamber to create a traction control pressure differential. The traction control pressure differential acts on the diaphragm to develop a force which is applied to the second flange to compress the return and permit a pressure differential to move the control valve and permit environmental air to create an operational pressure differential to develop a traction control output force. The traction control output force pressurized fluid in the master cylinder which is selectively applied to the wheel brakes to synchronize the rotational spin of the wheels.

5 Claims, 2 Drawing Sheets

CONTROL VALVE ACTUATOR

This invention relates to an input member having an input rod with first and second sections through which a control valve of a vacuum booster is selectively activated to effect a brake application from either a force developed by a traction servomotor in response to a signal indicating differences in the rotational spin of the wheels of a vehicle or an operator supplied force.

BACKGROUND OF THE INVENTION

Traction control circuits have been incorporated into anti-lock brake system to provide a way of synchronizing the rotational spin of the wheels of a vehicle. U.S. Pat. Nos. 4,778,225, 5,096,267 and 5,176,433 illustrate structure to accomplish such traction control in a manner acceptable to most vehicle operators. Unfortunately, during the activation of the traction control, the brake pedal which is directly connected to the movable wall of the vacuum brake booster moves during the activation of the traction control circuits or in order to incorporate the traction control structure into the brake system, the vacuum brake booster must be modified through the addition of various internal and external conduits which can significantly increase the cost of a brake system.

In co-pending patent application No. 08/068,881 filed May 28, 1993, traction control for a brake system was developed by modifying a standard production brake booster through the addition of a traction servomotor to the input member. The input member was designed to be responsive to either an input force applied through an operator pedal assembly or an input force produced by a traction servomotor responding to a signal derived from a difference in rotational spin of the drive wheels to effect a brake application of the wheels in a vehicle. The housing for the traction servomotor which was attached to the movable wall of the brake booster retained a movable wall which separated a first chamber from a second chamber. In response to an input signal derived by a controller, a pressure differential was developed across the movable wall to produce a traction control output force. This traction control output force was applied to the input member to move the control valve and selectively effect a brake application and synchronize the rotation spin of the wheels. This structure operates in a satisfactory manner, however the size of the traction servomotor required to develop an output force to operate the control valve added considerable weight to the overall brake system.

SUMMARY OF THE INVENTION

In the present invention through which traction control is added to a brake system, the input member through which either a manual force is provided to a control valve or a traction control force is applied to a control valve has been simplified. The input assembly has a housing formed by securing a front plate to a flange on a rear plate which is fixed to a cylindrical section of an input rod. The front plate has an axial opening and a first port while the rear plate also has an axial opening and a second port. A diaphragm has a first bead located between the front plate and the flange on the rear plate and a second bead attached to a sleeve that surrounds the input rod. The input rod has cylindrical body with a shoulder located between a first end attached to the control valve and a second end attached to the pedal arrangement. The cylindrical body being slidably located in the axial openings of the front and rear plates while a spring has a first end fixed to the movable wall of the brake booster acts on and urges the sleeve into engagement with shoulder of the input rod. A seal retained in the front plate acts on the sleeve to seal a traction control chamber defined by the front plate, diaphragm and sleeve from the surrounding environment. In a rest mode of operation, the spring acting through the sleeve, and input rod urges the control valve into sealing engagement with a poppet valve to prevent communication of environmental air to the brake booster although a pressure differential is created across the control valve, the spring maintains the sealing engagement. In response to a manual input force being applied to the pedal arrangement, the input rod moves after the force of the spring is overcome to initially allow the poppet valve to seat and thereafter move a face away from the poppet valve to permit environmental air to be presented to the brake booster to effect a brake application. When the manual input force terminates, the return spring again seats the face on the poppet valve to interrupt communication of environmental air to the brake booster. In response to a signal from the controller indicating a differential in the rotational spin of the wheels, vacuum is communicated to the traction control chamber to create a traction control pressure differential. This traction control pressure differential acts on the diaphragm and sleeve to move the flange on the sleeve away from the shoulder and compress the spring. Thereafter, the pressure differential acting on the control valve moves the control valve such that the poppet valve is seated and the face on the control valve moves from the poppet valve to allow environmental air to be communicated to the brake booster to develop an output force and pressurize fluid in the master cylinder which is selectively presented brake the wheels so synchronization is achieved in the rotational spin thereof.

The invention as disclosed herein offers an advantage over known brake system since a relative small servo motor can modify the return spring for the input member of a standard vacuum brake booster to provide traction control for the wheels of a vehicle.

It is an object of this invention to provide a vacuum brake booster with an input member through which a control valve can be activated through either an operator pedal assembly or a traction servomotor to effect a brake application in the wheels of a vehicle.

BRIEF DESCRIPTION OF THE DRAWINGS

These advantages and objects should be apparent from reading the specification while viewing the drawings wherein.

DETAILED DESCRIPTION OF THE INVENTION

Figures 1, 1A:
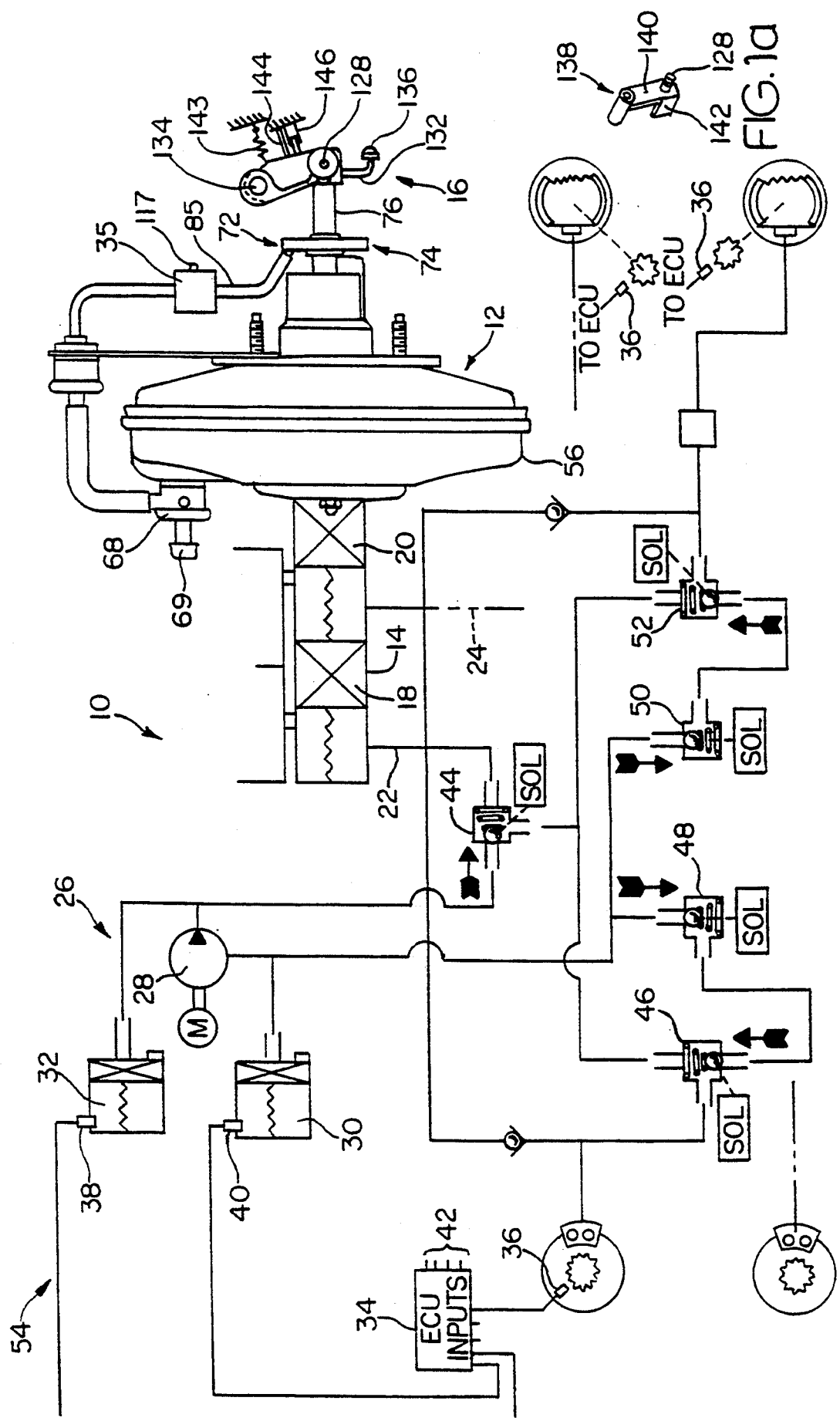
FIG. 1 is a schematic illustration of a brake system with brake booster having traction control added thereto through the addition of a servomotor for modifying a return spring in according to the present invention.
FIG. 1a is a perspective view of a portion of the pedal assembly of FIG. 1.

The brake system 10 shown in FIG. 1 includes a vacuum brake booster 12 which is connected to a master cylinder assembly 14 which supplies pressurized fluid to the wheels of a vehicle to effect a brake application in response to an operator input force supplied through pedal arrangement 16. The master cylinder 14 is of a type as disclosed in U.S. Pat. No. 4,474,005 wherein pressurized fluid created through movement of pistons 18 and 20 is supplied through primary and secondary circuits 22,24 to the appropriate wheels. Further, the master cylinder 14 is connected to a pump back type anti-lock brake system 54, such as disclosed in U.S. Pat. No. 4,778,226, which includes an assembly 26 with a motor driven pump 28, sump 30, accumulator 32 and an electronic control unit (ECU) 34. The electronic control unit (ECU) 34 continually receives input signals from wheel speed sensors 36 which sense rotational spin of the individual wheel and various pressure and position switches 38, 40 associated with the sump 30 and accumulator 32. Based on information derived from these input signals, ECU 34 generates output signals at terminals 42 to control a plurality of solenoid actuated valves 44, 46, 48, 50 and 52, for simplicity only the valves for circuit 22 are illustrated in the drawing but a similar number would be required for circuit 24. During a brake application, the signals from ECU 34 control the operation of the valves in brake circuits 22 and 24 to prevent wheel skid.

Figure 2:
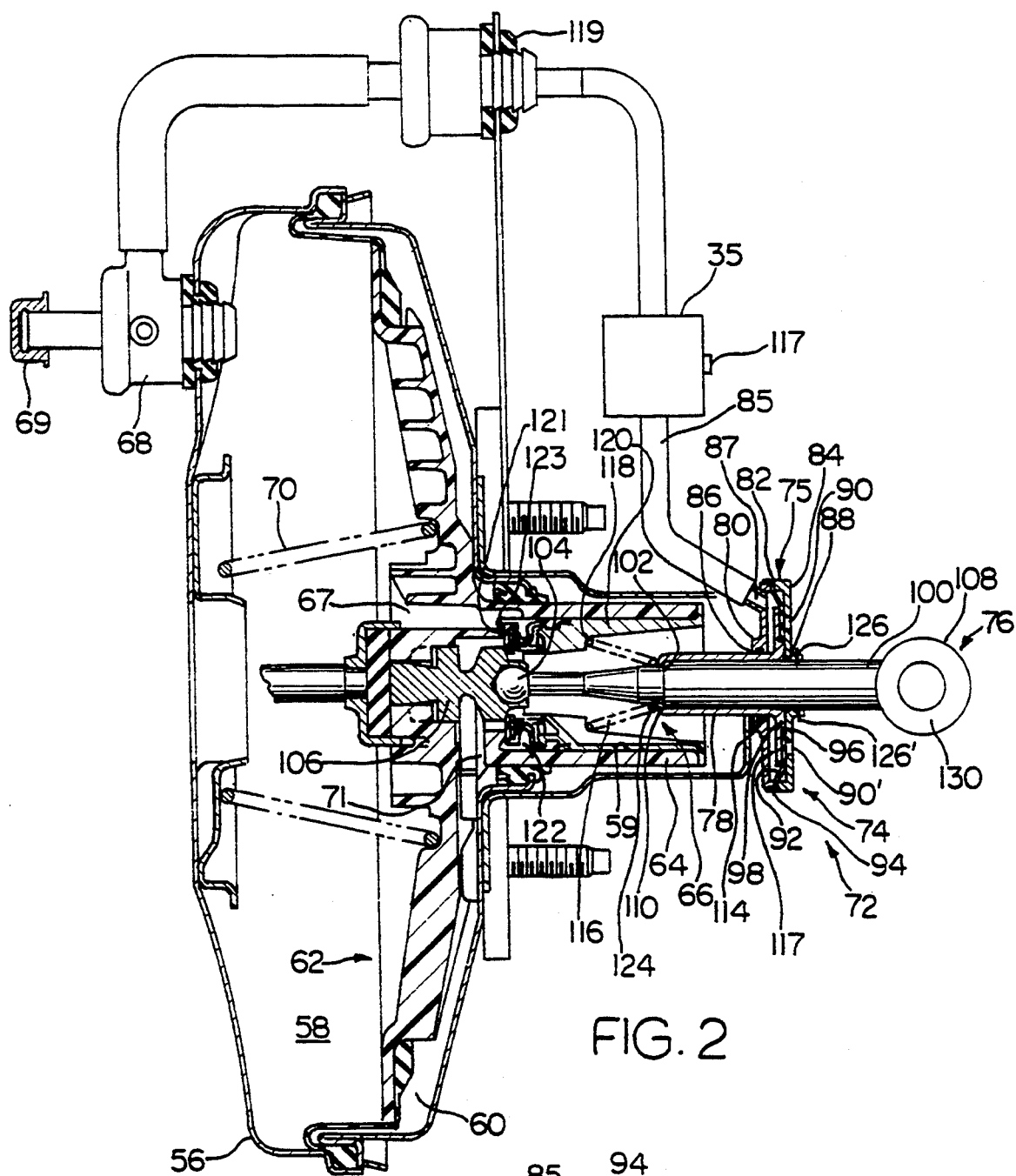
FIG. 2 is an enlarged view of the brake booster of FIG. 1.

The vacuum brake booster 12 as shown in FIG. 2 is of a type as disclosed in U.S. Pat. No. 4,953,446 which has a housing 56 which is separated into a from chamber 58 and a rear chamber 60 by a movable wall 62. The movable wall 62 has rearward cylindrical projection 64 which extends through the housing 56 with a bore 59 therein for retaining a control valve 66. Chamber 58 is connected through check valve 68 to a source of vacuum, normally the intake manifold 69 of an internal combustion engine in the vehicle. The movable wall 62 has internal passages 67 and 71 through which chamber 58 is connected to chamber 60. When the internal combustion engine is operating and control valve 66 is in the rest position shown in FIG. 2, vacuum evacuates air from chambers 58 and 60 to allow return spring 70 to position movable wall 62 in the rest position 2. The operation of control valve 66 is controlled by an input assembly 72 located between pedal arrangement 16 and control valve 66.

Figure 3:
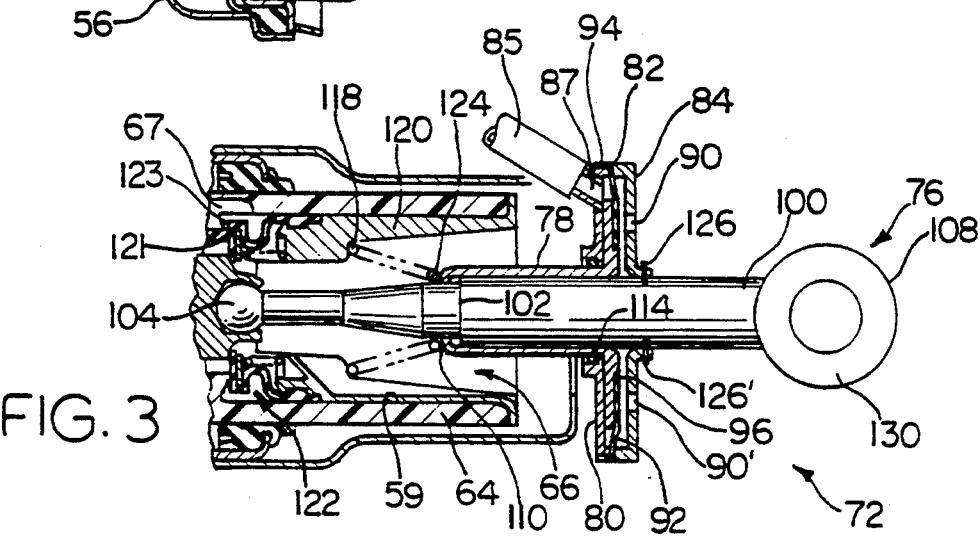
FIG. 3 is a view of the circumscribed section of FIG. 2 with the return spring for the control valve and input push rod compressed.

The input assembly 72 which includes traction servomotor 74, push rod 76, sleeve 78 and pedal arrangement 16 is best shown in FIG. 2 and 3.

The traction servomotor 74 has a housing 75 formed by securing a front plate 80 to a flange 82 on a rear plate 84. Front plane 80 has a first axial opening 86 therein and a first port 87 while the rear plate 84 has a second axial opening 88 therein and a second ports 90,90'. A diaphragm 92 which divides the interior of the housing 75 has a first bead 94 located between the first plate 80 and flange 82 and a second bead 96 attached to a flange 98 on sleeve 78. Port 87 is connected by line 85 to controller 35 associated with ECU 34 while ports 90,90' are freely connected to the surrounding environment.

Push rod 76 has a cylindrical body 100 with a shoulder 102 located between a first end 104 connected to plunger 106 of control valve 66 and an eye 130 formed on a second end 108 connected to pin 128 of pedal arrangement 16. Cylindrical body 100 is slidably located in the first 86 and second 88 axial openings of in the first 80 and second 84 plates, respectively.

Sleeve 78 which surrounds a portion of the cylindrical body 100 of input rod 74 has a first flange 110 that engages shoulder 102 and a second flange 98 which is connected to bead 96 on diaphragm 92. It is envisioned that diaphragm 92 could be molded onto flange 98 to aid in the manufacture of servomotor 74 by reducing time in the assembly of the input assembly.

A seal 114 which is retained in the front plate 80 engages sleeve 78 to seal a traction control chamber 117 defined by the front plane 80, diaphragm 92 and sleeve 78 from the surrounding environment.

The return spring 116 for control valve 66 has a first end 118 fixed to retainer 120 for the poppet valve 122 and a second end 124 that engages flange 110 on sleeve 78. The return spring acts on sleeve 78 to bring flange 110 into engagement with shoulder 102 and at the same time move the second flange 98 attached to diaphragm 92 against plate 84 which is fixed to cylindrical body 100 of push rod 76 by pins 126, 126'.

The pedal assembly 16 includes arm 132 with an end attached to pivot pin 134 and pad 136 through which an operator input is applied and an adapter 138. Adapter 138, which is best shown in FIG. 1a, is also located on pivot pin 134, has a rectangular member 140 which is substantially parallel to arm 132 which carries pin 128. A flange 142 which extends at substantially a right angle from rectangular member 140 is designed to engage and communicate any input force applied to pad 136 to push rod 76 by way of arm 132, pin 128 and eye 130. A pedal return spring 143 acts on and positions arm 132 against pedal stop 144 and stop light switch 146 when no force is applied to pad 136.

MODE OF OPERATION OF THE INVENTION

Under normal operating conditions of the vehicle, control valve 66 is positioned as shown in FIG. 2 to allow vacuum created at the intake manifold 69 of the engine and present at check valve 68 to evacuate air from chambers 58 and 60 in housing 56 by way of passage 67, that portion 159 of bore 59 in front of poppet valve 122 and passage 71. With vacuum or the pressure in chambers 58 and 60 equalized, return spring 70 positions movable wall 62 in the rest position as shown in FIG. 2. At the same time with the vehicle in a stopped condition, controller 35, which is a two way solenoid, and controlled by a signal from ECU 34 would be deactivated such atmospheric or surrounding environmental air is presented to traction control chamber 116 by way of opening 117. With air in chamber 117, return spring 116 urges flange 110 against shoulder 102 on push rod 76 to establish a solid connection.

In response to an operator applied input to pad 136, arm 132 pivots around pin 134 and supplies push rod 76 with an input force by way of flange 142 in adapter 138 and pin 128. The initial force applied through pin 128 overcomes return spring 116 and provides a manual input force to operate control valve 66. Initial movement of control valve 66 allows face 123 on poppet valve 122 to move into engagement with vacuum seat 121 to terminates vacuum communication to chamber 60 by way of passage 67 and further movement thereafter moves plunger 106 away from poppet valve 122 to allows air to be communicated to chamber 60 from the surrounding environment by way of bore 59 and passage 71. With air in chamber 60 and vacuum present in chamber 58, an operation pressure differential is created across movable wall 62 which produces an output force to effect a brake application in a manner as described in U.S. Pat. No. 4,953,446. When the vehicle is operating, sensors 36 continually monitor the rotational spin of the wheel and supply ECU 34 with information. If the information indicates that an anti-lock function is eminent, the ECU 34 introduces an anti-skid functional operation into brake system 10 in accordance with the teachings disclosed in U.S. Pat. No. 4,953,446. It should be noted that during a operator initiated brake application through an input force applied to the pedal arrangement 16, traction servomotor 74 moves with push rod 76 but has no effect on the input forces applied to control valve 66.

When the manual input force applied to pad 136 terminates, return spring 116 acts on and moves push rod 76 to initially bring plunger 106 into engagement with poppet valve 122 to terminate communication of environmental air chamber 60. The force of return spring 116 thereafter moves face on poppet valve 122 away from vacuum seat 121 to allow vacuum in chamber 58 to evacuate air from chamber 60 and eliminate or dissipate the pressure differential across movable wall 62. As the pressure differential is eliminated, return spring 70 moves movable wall 62 toward the rest position shown in FIG. 2.

In the event the information obtained from input signals supplied to ECU 34 by sensors 36 indicates a difference in the rotational spin of the driving wheels of the vehicle which exceeds a predetermined value, appropriate control signals are outputted by terminals 42 to activate controller or two way solenoid valve 35. Initial activation of controller 35 terminates communication of environmental air to traction control chamber 117 in the traction servomotor 74 and thereafter allows vacuum supplied from the intake manifold 69 through check valve 119 to evacuate air from traction control chamber 117. With vacuum supplied to chamber 117 a first traction control pressure differential is created across diaphragm 92. The first traction control pressure differential acts on the diaphragm 92 and flange 98 to move sleeve 78 on push rod 76 and compress return spring 116 as flange 110 moves away from shoulder 102, see FIG. 3. With the creation of a gap or separation occurring between flange 110 and shoulder 102, a second traction control pressure differential that is present across plunger 106 and poppet valve created between environmental air present in bore 59 and vacuum present in chamber 60 acts on and moves a face on plunger 106 away from poppet valve 122. With plunger 106 now unseated from poppet valve 122 environmental air is now communicated to chamber 60 by way of bore 59, section 159 and passage 71. With air in chamber 60 and vacuum present in chamber 58, an operation pressure differential is created across movable wall 62 which produces an output force in a manner as described in U.S. Pat. No. 4,953,446 to pressurize fluid in master cylinder 14. The pressurized fluid is selectively communication of pressurized fluid from the master cylinder 14 by ECU 34 to the individual driving wheels to effect braking thereof. Braking of such driving wheel will absorb a portion of an operational torque applied thereto and thereby synchronize its rotational spin with the rotational spin of a corresponding wheel. It should be noted that during the operation of brake booster 12 as a result of activation of controller 35 and traction servomotor 74, arm 132 is held in a stationary position by the spring 143 since adapter 138 can independently pivot on pin 134.

We claim:

1. In a brake system having a vacuum booster with a control valve responsive to movement of an input assembly, said input assembly selectively receiving an input signal from a controller and a pedal arrangement for developing an operational pressure differential between a control fluid and a source of vacuum fluid across a movable wall to create an output force for pressurizing fluid in a master cylinder to supply pressurized fluid to brakes associated with wheels of a vehicle, said controller developing an input signal from differences in the rotational spin of said wheels to selectively supply pressurized fluid to absorb a portion of an operational torque applied to drive said wheels and thereby synchronize the rotational spin of said wheels, said input assembly being characterized by a housing formed by securing a front plate to a flange on a rear plate, said front plate having a first axial opening therein and a first port, said rear plate having a second axial opening therein and a second port, a diaphragm having a first bead and a second bead, said first bead being located between said first plate and said flange, an input rod having a cylindrical body with a shoulder located between a first end connected to said control valve and a second end connected to said pedal arrangement, said cylindrical body being slidably located in said first and second axial openings of said first and second plates, a sleeve surrounding said input rod with a first flange that engages said shoulder and a second flange connected to a said second bead on said diaphragm; seal means connected to said front plate and engaging said sleeve seals a traction control chamber defined by said front plate, diaphragm and sleeve from the surrounding environment, said rear plate being fixed to said input rod and spring means having a first end fixed to said movable wall and a second end engaging said first flange on said sleeve, said spring means acting on said input rod by way of said first flange on said sleeve and shoulder to urge said control valve toward a poppet valve such that vacuum is communicated to an operational chamber adjacent said movable wall, said input rod being responsive to a manual input applied to said pedal arrangement by moving said control valve away from said poppet valve after overcoming said spring means to allow control fluid to create said operational pressure differential across said movable wall and develop an output force to effect a brake application, said spring means on termination of the manual input moving said input rod to return the control valve to a position to again allow vacuum to dissipate the operational pressure differential across the movable wall, said input signal to said controller allowing vacuum to be communicated to said traction control chamber to create a first traction control pressure differential across said diaphragm, said first traction control pressure differential acting on the second flange to move the first flange away from said shoulder by compressing said spring means and allow a pressure differential produced by environmental air and vacuum to act on and move said control valve away from said poppet valve to permit environmental air to thereafter create said operational pressure differential and develop said output force for pressurizing fluid in said master cylinder which is selectively supplied to the wheels to synchronize rotation thereof.

2. In the brake system as recited in claim 1 wherein said input rod includes a first section connected to said control valve and a second section connected to said operator pedal arrangement, said second section remaining stationary during movement of said first section by said pressure differential action on said control valve after said traction control pressure differential compresses said spring means.

3. In the brake system as recited in claim 2 wherein said spring means acts on said sleeve to move said second flange against said second plate as vacuum in the traction control chamber is replaced by environmental air on termination of said input signal to said controller.

4. In the brake system as recited in claim 3 further including reaction means located in said movable wall through which operational forces are supplied to said master cylinder, said pressurization of fluid in said master cylinder developing reaction force which opposed the operational forces during a brake application.

5. In the brake system as recited in claim 4 wherein said operational force developed in response to said input signal developed by the controller is a direct function of the movement of said spring means by said traction control pressure differential.

* * * * *